US010882461B2

(12) United States Patent
Feng et al.

(10) Patent No.: US 10,882,461 B2
(45) Date of Patent: Jan. 5, 2021

(54) WAVEGUIDE ENABLED EXTERNALLY DUCTED VEHICLE LOUDSPEAKER

(71) Applicant: Bose Corporation, Framingham, MA (US)

(72) Inventors: Ben J. Feng, Sudbury, MA (US); Douglas J. Holmi, Marlborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/249,208

(22) Filed: Jan. 16, 2019

(65) Prior Publication Data

US 2019/0248297 A1 Aug. 15, 2019

Related U.S. Application Data

(60) Provisional application No. 62/617,804, filed on Jan. 16, 2018.

(51) Int. Cl.
| | | |
|---|---|---|
| *H04R 1/02* | (2006.01) | |
| *B60R 11/02* | (2006.01) | |
| *H04R 1/28* | (2006.01) | |
| *B60R 11/00* | (2006.01) | |

(52) U.S. Cl.
CPC .......... *B60R 11/0217* (2013.01); *H04R 1/021* (2013.01); *H04R 1/2849* (2013.01); *H04R 1/2873* (2013.01); *B60R 2011/0003* (2013.01); *B60R 2011/004* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 5,170,435 A | | 12/1992 | Rosen et al. |
| 5,218,175 A | * | 6/1993 | Scarlata .............. B60R 11/0217 181/141 |
| 8,708,092 B2 | | 4/2014 | Ito et al. |
| 8,804,991 B2 | | 8/2014 | Velican |

(Continued)

FOREIGN PATENT DOCUMENTS

| | | |
|---|---|---|
| EP | 2779695 A2 | 9/2014 |
| EP | 2858377 A1 | 4/2015 |

(Continued)

OTHER PUBLICATIONS

"Closed Cylinder Frequency." Hyperphysics, Nov. 10, 2017, hyperphysics.phy-astr.gsu.edu/hbase/Waves/clocol.html. (Year: 2017).*

(Continued)

*Primary Examiner* — James K Mooney
(74) *Attorney, Agent, or Firm* — Bose Corporation

(57) ABSTRACT

An acoustic conduit provides a waveguide for coupling a loudspeaker inside a vehicle to a region outside the vehicle, or vice versa. The acoustic conduit includes a proximal opening configured to accommodate the loudspeaker. A distal opening is configured to acoustically couple to an exterior of the vehicle. The acoustic conduit defines an interior volume between the proximal opening and the distal opening and is configured to provide waveguide acoustic coupling between the loudspeaker and the exterior.

20 Claims, 7 Drawing Sheets

(56) References Cited

U.S. PATENT DOCUMENTS

| | | |
|---|---|---|
| 8,837,762 B2 | 9/2014 | Tada |
| 9,025,790 B2 | 5/2015 | Tada |
| 9,386,376 B2 | 7/2016 | Tada et al. |
| 9,591,388 B2 | 3/2017 | Tanabe |
| 9,743,163 B2 | 8/2017 | Ito |
| 9,963,083 B2 | 5/2018 | Ito et al. |
| 2013/0034255 A1* | 2/2013 | Parker .................. H04R 1/2857 381/338 |
| 2014/0270270 A1* | 9/2014 | Ito ........................... H04R 1/00 381/162 |
| 2015/0030178 A1 | 1/2015 | Sulowski |
| 2015/0098586 A1* | 4/2015 | Tanabe ................ H04R 1/2849 381/86 |
| 2017/0341592 A1* | 11/2017 | Ito ....................... B60R 11/0217 |
| 2017/0359639 A1 | 12/2017 | Timo et al. |

FOREIGN PATENT DOCUMENTS

| | | |
|---|---|---|
| EP | 2941011 A1 | 11/2015 |
| EP | 3249946 A1 | 11/2017 |
| JP | S63211999 A | 9/1988 |
| JP | 5441837 B2 | 3/2014 |
| JP | 2015139144 A | 7/2015 |
| JP | 5825521 B2 | 12/2015 |
| JP | 6433172 B2 | 12/2018 |

OTHER PUBLICATIONS

International Search Report and Written Opinion dated Mar. 24, 2019 for PCT/US19/13789.

* cited by examiner

WAVEGUIDE ENABLED EXTERNALLY DUCTED VEHICLE LOUDSPEAKER

CROSS REFERENCE TO RELATED APPLICATIONS

This application claims the benefit of U.S. Patent Application No. 62/617,804 filed on Jan. 16, 2018, which is incorporated herein by reference in its entirety for all purposes.

TECHNICAL FIELD

This disclosure generally relates to vehicle audio systems. More particularly, the disclosure relates to a ducted vehicle loudspeaker and related vehicle audio systems.

BACKGROUND

The reproduction of low frequency sound in a vehicle can be difficult, mainly due to the need to generate significant levels of volume velocity, combined with the practical limitations of dimensions of the vehicle speaker system. Sealed enclosures generally require too much volume to be practical in a vehicular application. Similarly, conventional ported box structures may require significant enclosure dimensions to be large enough to obtain the desired output from the port, e.g., when ported to the interior of the vehicle. Coupling a loudspeaker to an exterior of the vehicle may provide a beneficial solution, e.g., acting as an infinite baffle, but there exists a need for an acoustic coupling structure to modify the response of the loudspeaker inside the vehicle and to improve the efficiency of acoustic energy produced in the interior as opposed to being leaked to the exterior of the vehicle.

SUMMARY

Aspects and examples are directed to loudspeaker systems that include an acoustic conduit configured to acoustically couple a sound-producing surface of an acoustic transducer (e.g., a loudspeaker) of a vehicle audio system through to a distal opening or mouth. In various examples, the conduit may couple an interior loudspeaker to an exterior of the vehicle or may couple an exterior loudspeaker to an interior of the vehicle. In other examples, the conduit may couple an interior loudspeaker to another interior region of the vehicle. According to aspects and examples, the acoustic conduit is in the form of a waveguide and not a Helmholtz resonator. Conventional systems use Helmholtz resonators, such as a ported box including a chamber and duct. Such ducts conventionally have cross sectional areas relatively small in comparison to dimensions of the chamber. Accordingly, conventional ported box structures act like a spring and mass of an equivalent mechanical system. Acoustic conduits in accord with those herein include waveguides without such a ported box structure. Various examples include waveguides that may be straight or tapered and/or may include curvature or arcuate surfaces.

According to one aspect, an acoustic conduit is provided that includes a proximal opening configured to accommodate a loudspeaker and acoustically couple to a first radiating surface of the loudspeaker, a distal opening configured to acoustically couple to a region, and an interior volume between the proximal opening and the distal opening, configured to provide waveguide acoustic coupling between the loudspeaker and the region, the interior volume having a cross sectional profile between the proximal opening and the distal opening, the acoustic conduit is further configured to be coupled to a vehicle such that the distal opening is acoustically coupled to a selected one of an exterior or an interior of the vehicle and the proximal opening is configured to position the loudspeaker such that a second radiating surface of the loudspeaker is acoustically coupled to the other of the exterior or the interior of the vehicle.

In certain examples, the interior volume is formed of interior surfaces including only planar or concave curved surfaces.

In some examples, the interior volume is formed of interior surfaces that include only planar surfaces, concave curvatures, or convex curvatures having a radius of curvature less than a half-inch.

According to various examples, the cross sectional profile includes at most one or more of a constant cross section or a gradually changing cross section.

In various examples, the acoustic conduit is dimensioned to have a fundamental resonant frequency greater than an operating band of the loudspeaker.

In certain examples, the acoustic conduit is dimensioned to have a fundamental resonant frequency of 100 Hz or greater.

According to various examples, the interior volume forms a unitary acoustic volume. Such a unitary acoustic volume may be unsuitable for acoustic analysis as more than a single acoustic structure. Accordingly, the interior volume forms a single acoustical region and includes no transitions into a second acoustic region.

According to another aspect, a loudspeaker assembly is provided that includes an acoustic conduit having a first opening configured to accommodate a loudspeaker, a second opening configured to acoustically couple to a region, and an interior volume between the first opening and the second opening and configured to provide acoustic coupling between the first opening and the second opening, the interior volume having a cross sectional profile between the first opening and the second opening, the acoustic conduit further configured to be coupled to a vehicle such that the first opening is acoustically coupled to a selected one of an exterior or an interior of the vehicle and the second opening is acoustically coupled to the other of the exterior or the interior of the vehicle, and a loudspeaker coupled to the first opening.

In certain examples, the interior volume is formed of interior surfaces including only planar or concave curved surfaces.

In some examples, the interior volume is formed of interior surfaces that include only planar surfaces, concave curvatures, or convex curvatures having a radius of curvature less than a half-inch.

According to various examples, the cross sectional profile includes at most one or more of a constant cross section or a gradually changing cross section.

In various examples, the acoustic conduit is dimensioned to have a fundamental resonant frequency greater than an operating band of the loudspeaker.

In certain examples, the acoustic conduit is dimensioned to have a fundamental resonant frequency of 100 Hz or greater.

According to various examples, the interior volume forms a unitary acoustic volume. Such a unitary acoustic volume may be unsuitable for acoustic analysis as more than a single acoustical structure. Accordingly, the interior volume forms a single acoustic region and includes no transitions into a second acoustic region.

According to another aspect, a vehicle is provided that includes a body panel including a partition that separates an interior space from an exterior space, an acoustic waveguide coupled to the body panel and defining an acoustic volume that acoustically couples the interior space to the exterior space via a substantially gradually changing cross section, the acoustic waveguide having a first opening that acoustically couples to a selected one of the interior space or the exterior space and an opposing opening configured to accommodate a loudspeaker acoustically coupled to the other of the interior space or the exterior space, and a loudspeaker coupled to the acoustic waveguide at the opposing opening, the loudspeaker being acoustically coupled to the acoustic waveguide at a first portion of a radiating surface and being acoustically coupled to the other of the interior space or the exterior space at a second portion of a radiating surface.

In certain examples, the acoustic volume is formed of interior surfaces including only planar or concave curved surfaces.

In some examples, the acoustic volume is formed of interior surfaces that include only planar surfaces, concave curvatures, or convex curvatures having a radius of curvature less than a half-inch.

In various examples, the acoustic waveguide is dimensioned to have a fundamental resonant frequency greater than an operating band of the loudspeaker.

In certain examples, the acoustic waveguide is dimensioned to have a fundamental resonant frequency of 100 Hz or greater.

According to various examples, the acoustic volume is a unitary acoustic volume. Such a unitary acoustic volume may be unsuitable for acoustic analysis as more than a single acoustical structure. Accordingly, the acoustic volume forms a single acoustic region and includes no transitions into a second acoustic region.

Still other aspects, examples, and advantages are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Aspects of the present disclosure are directed to one or more waveguides for use in vehicular audio systems, one or more loudspeaker assemblies including such a waveguide, and vehicular audio systems including such a loudspeaker assembly. Aspects and examples disclosed herein achieve modified response of a loudspeaker by acoustic coupling through a waveguide, and in some examples by acoustically coupling to an exterior of the vehicle.

In some examples, a loudspeaker system for use in a vehicle with inside surfaces that enclose a passenger compartment or cabin, includes an automotive loudspeaker assembly having a loudspeaker and at least one elongated conduit having a proximal portion and a distal portion. The loudspeaker has a vibrating surface for generating sound pressure waves in response to, e.g., electrical stimulation. The proximal portion of the elongated conduit is open to one side of the loudspeaker vibrating surface. An opposing loudspeaker vibrating surface (the side not open to the elongated conduit) is either open to the passenger compartment or open to a space external to the passenger compartment. The distal portion of the elongated conduit can be either open to the passenger compartment or open to a space external to the passenger compartment.

In some implementations, an automotive loudspeaker assembly comprises a loudspeaker (an acoustic driver) with a radiating diaphragm or surface, an actuator for causing acoustic vibration of the radiating surface (such as a motor), and a conduit mounted on the 'front' or 'rear' of the loudspeaker. In various examples, one side of the loudspeaker diaphragm communicates with the passenger compartment or cabin of an automobile while the other side of the diaphragm communicates with an acoustic space outside of the cabin. The conduit couples one side of the diaphragm to either the cabin or the outside space. In various examples, the conduit can be located within the cabin, external to the cabin, or partially within and partially external to the cabin. In various examples, a boundary or partition that divides and defines the interior from the exterior of the cabin may be an inside surface of the vehicle body or may be any suitable boundary or partition.

The conduit is formed and dimensioned to act as an acoustic waveguide. An acoustic waveguide may be a speaker enclosure having an effective length that is one quarter of a primary resonant frequency. Such an acoustic waveguide needs only the one acoustic component, the conduit, in order to support a resonance, which is distinct from a Helmholtz resonator which consists of at least two regions or parts, a chamber and a duct, where the resonant frequency depends on both the acoustic compliance of the chamber and the acoustic mass of the duct. Acoustic conduits in the form of waveguides, in accord with aspects and examples herein, do not have the form of a chamber and duct.

Figure 1A:
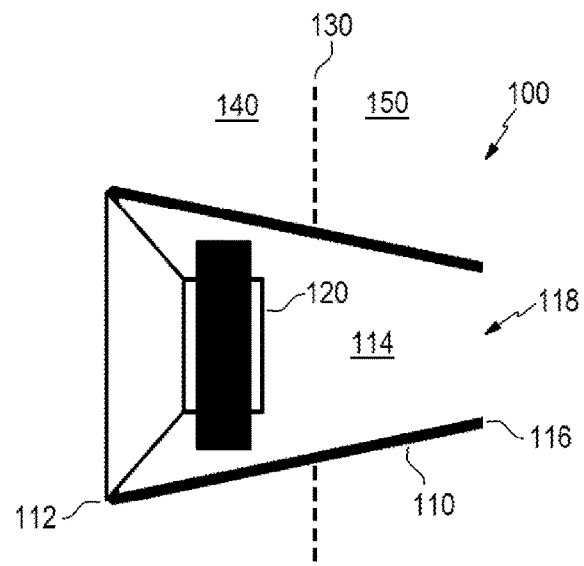
FIGS. 1A-1C are schematic diagrams of an example loudspeaker assembly in various positions relative to a vehicle partition.

FIG. 1A illustrates a loudspeaker assembly 100 formed of an acoustic conduit 110 and a loudspeaker 120. The acoustic conduit 110 includes a proximal end 112, an internal volume 114, and a distal end 116. The loudspeaker 120 may be mounted at the proximal end 112 such that at least a portion of a radiating surface of the loudspeaker 120 is acoustically coupled to the interior volume 114. The distal end 116 includes a mouth or opening 118. Accordingly, when installed or in use, the acoustic conduit 110 may form an acoustic waveguide having a closed end formed of the loudspeaker 120 mounted at the proximal end 112 and an open end formed by the mouth 118 at the distal end.

In various examples, the acoustic conduit 110 is configured to be mounted or physically coupled to a vehicle having a partition or boundary 130 that divides and defines a first region 140 from a second region 150. In various examples, the first region 140 may be a cabin or other interior of the vehicle and the second region 150 may be outside of the cabin or exterior (or a space coupled to the exterior) of the vehicle. In other examples, the first region 140 may be the outside or exterior, and the second region 150 may be the interior. At least a portion of radiating surface of the loudspeaker 120 (a portion that isn't acoustically coupled to the interior volume 114) may be acoustically coupled to the first region 140. The mouth 118 of the distal end 116 may be acoustically coupled to the second region 150. Accordingly, the interior volume 114 forms a waveguide configured to acoustically couple the loudspeaker 120 to the second region 150.

Figure 1B:
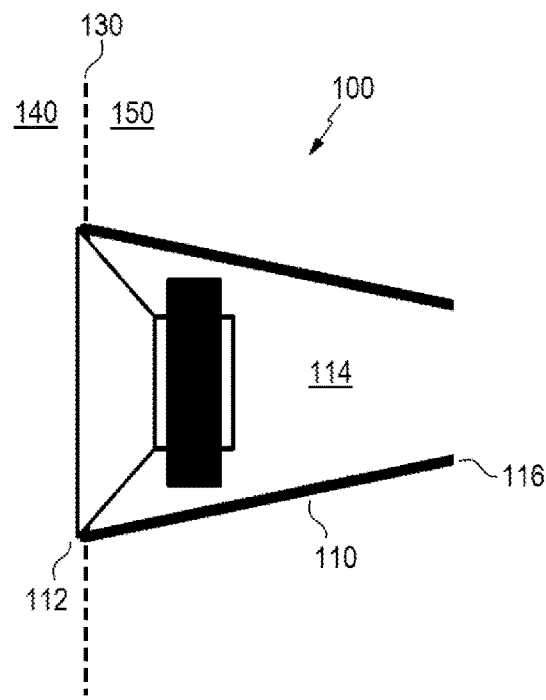
Figure 1C:
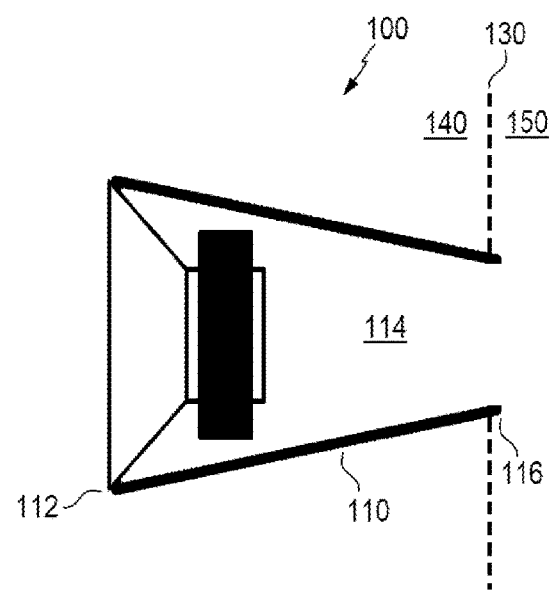

In various examples, the acoustic conduit 110 may be physically coupled to the vehicle in various manners and may be positioned in relation to the boundary 130 such that the acoustic conduit 110 may be partially in each of the first and second regions 140, 150, e.g., as illustrated in FIG. 1A, or may be substantially in either of the first region 140, e.g., as illustrated in FIG. 1B, or the second region 150, e.g., as illustrated in FIG. 1C.

Figure 2A:
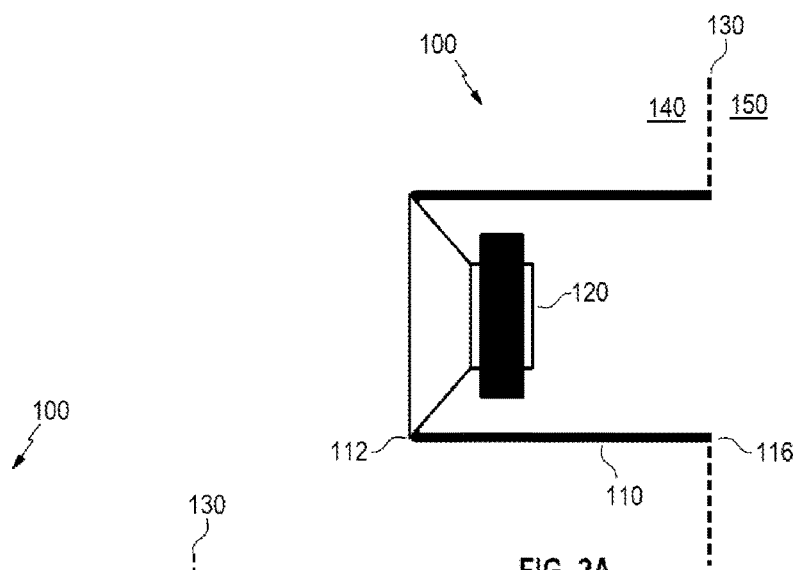
FIGS. 2A-2C are schematic diagrams of various other example loudspeaker assemblies.
Figure 2B:
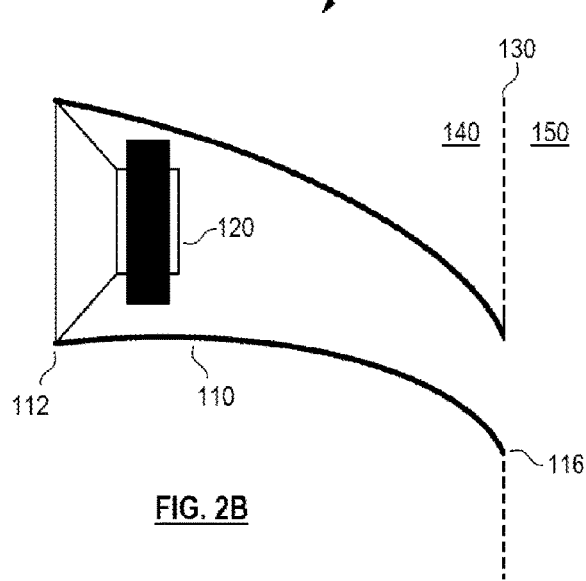
Figure 2C:
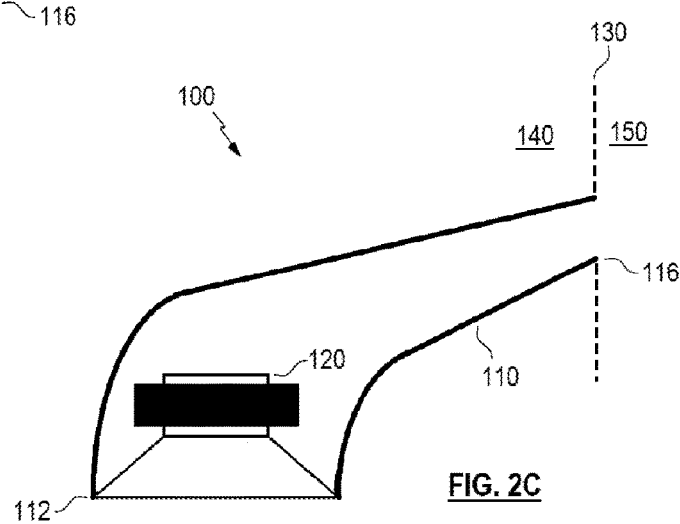

An acoustic conduit that forms a waveguide in accord with aspects and examples herein may have any of various shapes. For example, the acoustic conduit 110 of FIGS. 1A-1C may be linear or conical tapered waveguides, whose interior volume 114 includes a cross sectional area that decreases from the proximal end 112 to the distal end 116. In other examples, the interior volume 114 may include a constant cross section or may include an increasing cross sectional area, or any combination of constant, increasing, or decreasing cross sectional areas. Various examples include a waveguide having variable cross sectional area, and may be straight sided, tapered, or have any irregular interior surface or side-wall shape, including simple and complex curvatures. For reference, an example acoustic conduit having a constant cross section is illustrated in FIG. 2A. Some further examples of a decreasing cross section are illustrated in FIGS. 2B-2C.

Figure 3A:
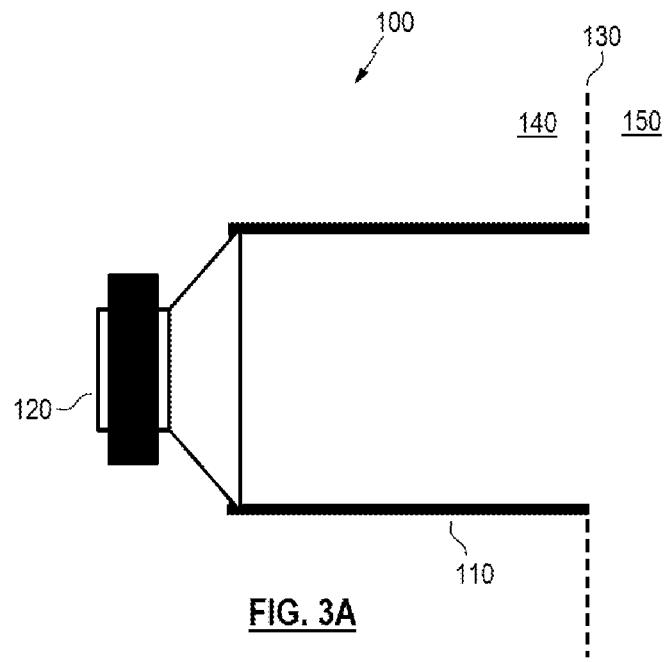
FIGS. 3A-3B are schematic diagrams of example loudspeaker assemblies having an alternate loudspeaker orientation.
Figure 3B:
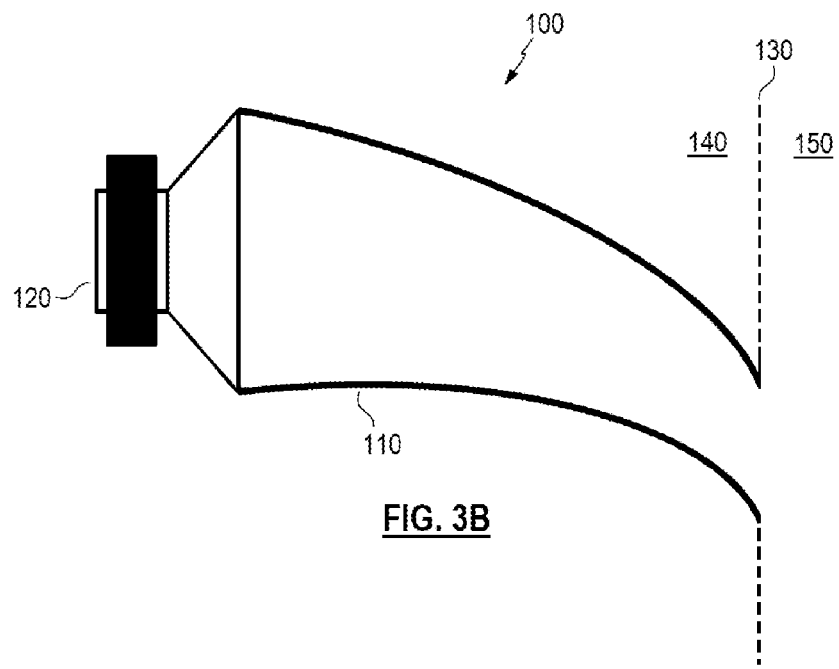

While each of FIGS. 1A-1C and 2A-2C are shown with the loudspeaker 120 coupled to the proximal end 112 in a particular orientation, in various examples the loudspeaker 120 may be coupled (or mounted) to the proximal end 112 in various ways and orientations, as illustrated, for example, in FIGS. 3A-3B.

Figure 4A:
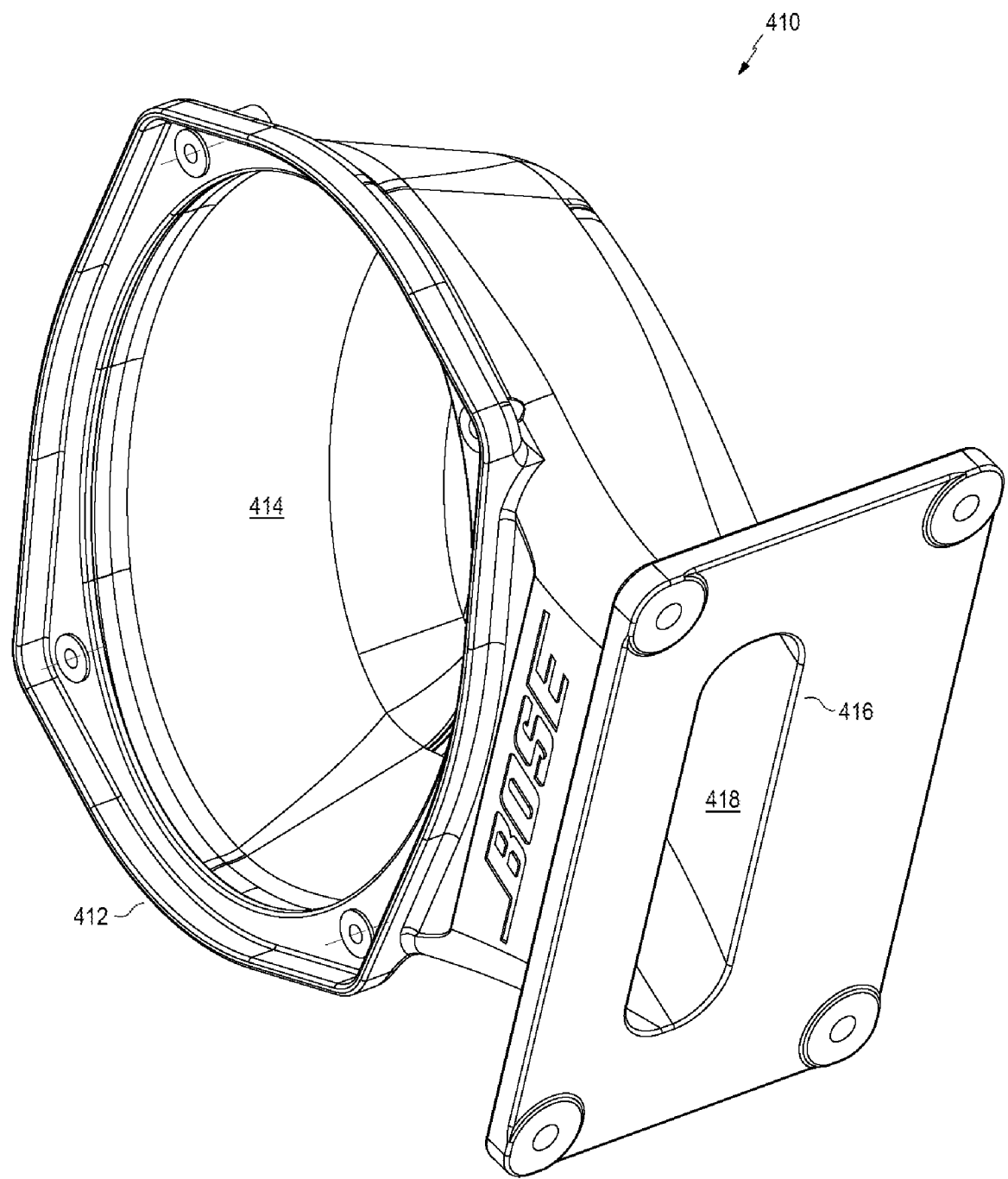
FIGS. 4A-4C are schematic diagrams of an example acoustic conduit for use in a loudspeaker assembly.
Figure 4B:
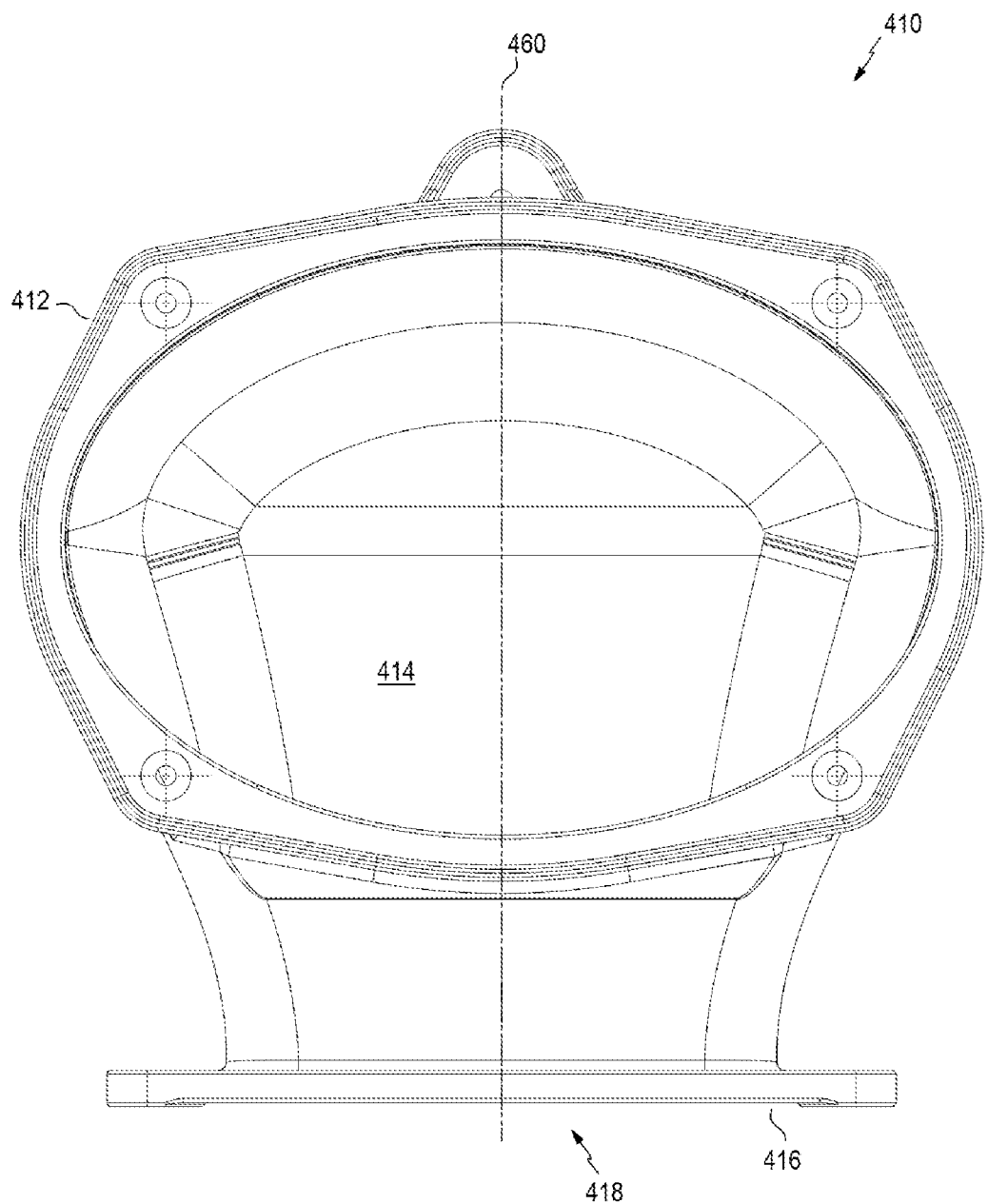
Figure 4C:
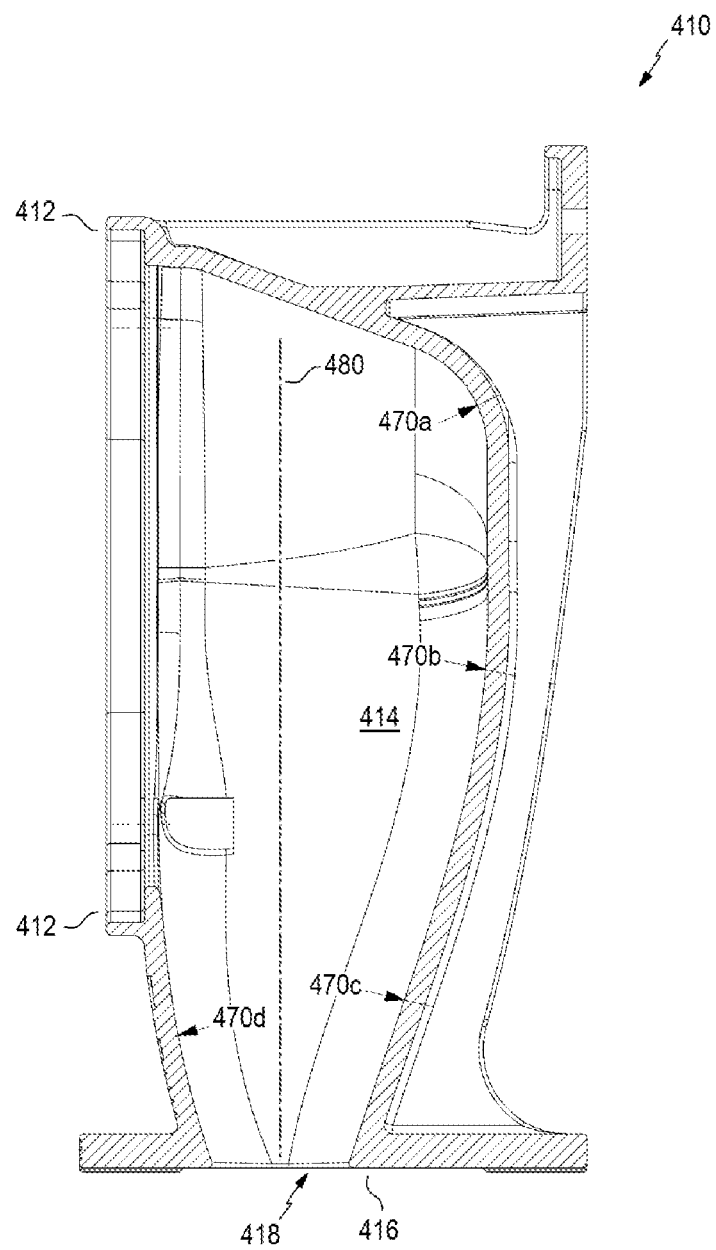

FIGS. 4A-4C illustrate varying views of an example acoustic conduit 410 that may be used as the acoustic conduit 110 of a loudspeaker assembly 100 as variously illustrated above. Similar to the acoustic conduit(s) 110 illustrated above, the acoustic conduit 410 includes a proximal end 412, an interior volume 414, and a distal end 416. The distal end 416 includes a mouth 418. According to the example acoustic conduit 410, the distal end 416 also forms a flange for mounting or physically affixing the acoustic conduit 410 to, e.g., a vehicle partition. The proximal end 412 is configured to accommodate a loudspeaker, such as a 6"×9" loudspeaker in some examples, but may accommodate any of various loudspeaker sizes and/or form factors as known in the art, in other examples.

FIG. 4B illustrates a "front" view of the acoustic conduit 410 and includes a center line 460 for reference.

FIG. 4C illustrates a "side" view of the acoustic conduit 410, shown in cross-section along the center line 460 of FIG. 4B. FIG. 4C also illustrates a number of curvatures 470 of an interior surface of the acoustic conduit 410. According to various examples, the curvatures 470 are relatively gradual such that a cross sectional area, as described in more detail below, has no drastic reductions or expansions, such that the interior volume 414 does not form a ported box or ducted chamber, e.g., it does not include a duct which conventionally acts as an acoustic mass.

Accordingly, in some examples, a loudspeaker assembly may include an acoustic conduit configured to act as a waveguide for a loudspeaker and may include various interior curvatures, e.g., that curve toward or away form a reference axis 480. There may be numerous structures that may form a waveguide and numerous design criteria or design approaches to form a suitable acoustic conduit in accord with aspects and examples herein. For example, some acoustic conduits in accord with those described herein may include interior surfaces having only planar and concave curvatures (as viewed from the inside, like the curvatures 470 illustrated in FIG. 4C), and not including any convex interior surfaces. Such examples may have sharp bends or edges at the terminal ends, e.g., the proximal end 412 and the distal end 416, to accommodate the openings at the ends, and to accommodate mounting features such as a flange or a recess to accommodate a frame of the loudspeaker, for example. In various examples, such features at the terminal ends of an acoustic conduit may be considered exterior features, e.g., not contributing to the shape or form of the interior volume.

In some examples, the interior volume may include interior surfaces having a convex curvature, but of limited radius of curvature to avoid sharp bends, edges, or corners that would intrude upon the interior volume and may otherwise form a drastic reduction in cross section and/or may form a distinct acoustic volume. Accordingly, in some examples, an acoustic conduit in accord with those herein may include one or more convex interior surfaces having a radius of curvature limited to no less than one inch. In some examples, the acoustic conduit may include convex interior surfaces having a radius of curvature limited to no less than a half-inch. As stated above, sharper curvatures or corners may be included to form the proximal end, the distal end, or a flange or other shape associated with the ends or an opening, any of which may be considered exterior features and therefore not an interior surface.

In various examples, a corner may be defined as a curvature having a very small or infinitesimal radius of curvature. Accordingly, in various examples as described above, the interior volume of acoustic conduits in accord with those herein may include concave corners but not convex corners.

Figure 5:
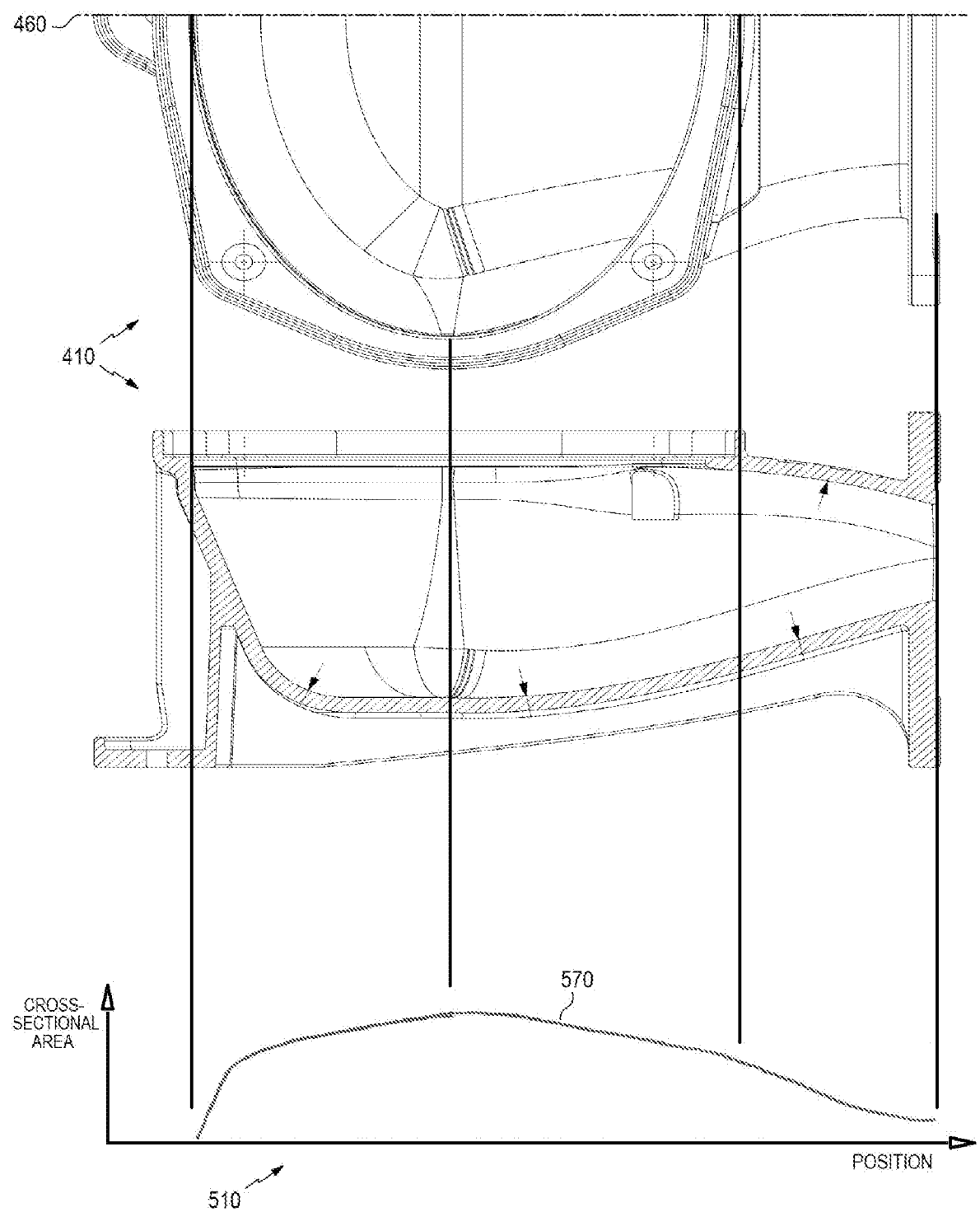
FIG. 5 is a schematic diagram illustrating cross sectional variation of the acoustic conduit of FIGS. 4A-4C.

FIG. 5 illustrates a cross sectional profile of the acoustic conduit 410 along the center line 460 or the reference axis 480. A graph 510 includes a plot 570 of the cross sectional area (on the Y-axis) versus position (on the X-axis). The plot 570 is a substantially smooth curve with no sharp corners or drastic changes along the axis, thus illustrating substantially gradual variations in the cross section without drastic reduction or expansion of the cross section along the axis. Accordingly, the acoustic conduit 410 forms a substantially continuous waveguide, being a substantially fluent unitary structure, without distinct "lump" elements of a chamber and duct. Further, acoustic conduits in accord with those herein form a unitary interior acoustic volume and do not include a plurality of acoustic volumes. Accordingly, in various examples, the acoustic conduit may not be suitable for acoustic analysis as more than a single acoustic volume or interior structure.

In various examples, the acoustic conduit may be dimensioned to have a fundamental resonant frequency above an operating band of the loudspeaker. In some examples, the acoustic conduit may be dimensioned to have a fundamental acoustic resonant frequency of 100 Hz or greater.

According to various examples, the resonance of the loudspeaker assembly may be above the operating band of the loudspeaker driver, but in other examples the waveguide resonance may be within the operating band of the loudspeaker driver.

In various examples, a loudspeaker assembly may include multiple waveguides, such as one acoustic conduit waveguide positioned on each side of the loudspeaker diaphragm or where multiple acoustic conduit waveguides are positioned on any side of the loudspeaker diaphragm. In some examples, a composite loudspeaker assembly may include two loudspeaker assemblies as described herein arranged as face-to-face, back-to-back, or face-to-back, and in such cases the loudspeaker diaphragms may trap a volume of air between them, for example.

In accord with various examples herein, an acoustic transducer, driver, or loudspeaker, may be any of many types of transducers known in the art. For example, an acoustic diaphragm coupled to a magnetic coil positioned in a magnetic field, to cause motion in response to electrical signals received by the coil, may be a suitable acoustic transducer. Additionally, a piezoelectric material may respond to electrical signals by expanding or contracting in one or more dimensions and may be a suitable acoustic transducer and/or may be coupled to an acoustic diaphragm or other radiating structure. In various examples, acoustic transducers may take other forms.

Examples of the methods and apparatuses discussed herein are not limited in application to the details of construction and the arrangement of components set forth in the description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An acoustic conduit, comprising:
   a proximal opening configured to accommodate a loudspeaker and acoustically couple to a first radiating surface of the loudspeaker;
   a distal opening configured to acoustically couple to a region; and
   an interior volume forming a unitary acoustic volume between the proximal opening and the distal opening, configured to provide waveguide acoustic coupling between the loudspeaker and the region, the interior volume having a cross sectional profile between the proximal opening and the distal opening,
   the acoustic conduit dimensioned to have a fundamental resonant frequency of 100 Hz or greater and further configured to be coupled to a vehicle such that the distal opening is acoustically coupled to a selected one of an exterior or an interior of the vehicle and the proximal opening is configured to position the loudspeaker such that a second radiating surface of the loudspeaker is acoustically coupled to the other of the exterior or the interior of the vehicle.

2. The acoustic conduit of claim 1 wherein the interior volume is formed of interior surfaces including only planar or concave curved surfaces.

3. The acoustic conduit of claim 1 wherein the interior volume is formed of interior surfaces that include only planar surfaces, concave curvatures, or convex curvatures having a radius of curvature no less than a half-inch.

4. The acoustic conduit of claim 1 wherein the cross sectional profile includes at most one or more of a constant cross section or a gradually changing cross section.

5. The acoustic conduit of claim 1 wherein the acoustic conduit is dimensioned to have a fundamental resonant frequency greater than an operating band of the loudspeaker.

6. The acoustic conduit of claim 1 wherein the unitary acoustic volume is configured to not form a chamber and a duct when installed.

7. A loudspeaker assembly, comprising:
   an acoustic conduit having a first opening configured to accommodate a loudspeaker, a second opening configured to acoustically couple to a region, and an interior volume forming a unitary acoustic volume between the first opening and the second opening and configured to provide waveguide acoustic coupling between the first opening and the second opening, the interior volume having a cross sectional profile between the first opening and the second opening, the acoustic conduit dimensioned to have a fundamental resonant frequency of 100 Hz or greater and further configured to be coupled to a vehicle such that the first opening is acoustically coupled to a selected one of an exterior or an interior of the vehicle and the second opening is acoustically coupled to the other of the exterior or the interior of the vehicle; and
a loudspeaker coupled to the first opening.

8. The loudspeaker assembly of claim 7 wherein the interior volume is formed of interior surfaces including only planar or concave curved surfaces.

9. The loudspeaker assembly of claim 7 wherein the interior volume is formed of interior surfaces that include only planar surfaces, concave curvatures, or convex curvatures having a radius of curvature no less than a half-inch.

10. The loudspeaker assembly of claim 7 wherein the cross sectional profile includes at most one or more of a constant cross section or a gradually changing cross section.

11. The loudspeaker assembly of claim 7 wherein the acoustic conduit is dimensioned to have a fundamental resonant frequency greater than an operating band of the loudspeaker.

12. The loudspeaker assembly of claim 7 wherein the interior volume is configured to not form a chamber and a duct when installed.

13. A vehicle, comprising:
a body panel including a partition that separates an interior space from an exterior space;
an acoustic waveguide coupled to the body panel and defining an acoustic volume that acoustically couples the interior space to the exterior space via a gradually changing cross section, the acoustic waveguide dimensioned to have a fundamental resonant frequency of 100 Hz or greater and having a first opening that acoustically couples to a selected one of the interior space or the exterior space and an opposing opening configured to accommodate a loudspeaker acoustically coupled to the other of the interior space or the exterior space; and
a loudspeaker coupled to the acoustic waveguide at the opposing opening, the loudspeaker being acoustically coupled to the acoustic waveguide at a first portion of a radiating surface and being acoustically coupled to the other of the interior space or the exterior space at a second portion of a radiating surface.

14. The vehicle of claim 13 wherein the acoustic volume is formed of interior surfaces including only planar or concave curved surfaces.

15. The vehicle of claim 13 wherein the acoustic volume is formed of interior surfaces that include only planar surfaces, concave curvatures, or convex curvatures having a radius of curvature no less than a half-inch.

16. The vehicle of claim 13 wherein the acoustic waveguide is dimensioned to have a fundamental resonant frequency greater than an operating band of the loudspeaker.

17. The vehicle of claim 13 wherein the acoustic volume is a unitary acoustic volume.

18. A loudspeaker assembly, comprising:
an acoustic conduit having:
a proximal opening configured to accommodate a loudspeaker and acoustically couple to a first radiating surface of the loudspeaker,
a distal opening configured to acoustically couple to a region, and
an interior volume forming a unitary acoustic volume between the proximal opening and the distal opening, configured to provide waveguide acoustic coupling between the loudspeaker and the region, the interior volume having a cross sectional profile between the proximal opening and the distal opening,
the acoustic conduit dimensioned to have a fundamental resonant frequency greater than an operating band of the loudspeaker and further configured to be coupled to a vehicle such that the distal opening is acoustically coupled to a selected one of an exterior or an interior of the vehicle and the proximal opening is configured to position the loudspeaker such that a second radiating surface of the loudspeaker is acoustically coupled to the other of the exterior or the interior of the vehicle.

19. The loudspeaker assembly of claim 18 further comprising a loudspeaker coupled to the proximal opening.

20. The loudspeaker assembly of claim 19 wherein the acoustic conduit is configured to not form a chamber and a duct when installed.

* * * * *